United States Patent

Grimes et al.

[11] 4,321,828
[45] Mar. 30, 1982

[54] RADIANT HEAT COLLECTOR-SENSOR TEMPERATURE CONTROL SYSTEM

[75] Inventors: Steven D. Grimes; Thomas J. Mihalcik, both of Sulphur, La.

[73] Assignee: Conoco Inc., Ponca City, Okla.

[21] Appl. No.: 111,574

[22] Filed: Jan. 14, 1980

[51] Int. Cl.³ ............................................ G01K 13/08
[52] U.S. Cl. ..................................................... 73/351
[58] Field of Search ......................................... 73/351

[56] References Cited

U.S. PATENT DOCUMENTS 3,309,236  3/1967  Gunji ............................... 73/351 X
3,896,556  7/1975  Welter ................................... 34/9

Primary Examiner—Kyle L. Howell
Assistant Examiner—Joseph W. Roskos
Attorney, Agent, or Firm—Richard W. Collins

[57] ABSTRACT

A temperature control system for a rotary drum is disclosed. The system utilizes parabolic heat collectors mounted adjacent the exterior of a rotating drum, and heat sensors inside the collectors provide control signals for the system.

1 Claim, 3 Drawing Figures

RADIANT HEAT COLLECTOR-SENSOR TEMPERATURE CONTROL SYSTEM

BACKGROUND OF THE INVENTION

This invention relates to temperature control systems for rotating cylindrical drums containing hot material. More particularly, the invention relates to heat collector-sensors which can be placed outside a rotating drum and still allow effective control of the interior temperature thereof.

Several techniques for measuring temperatures in rotating drums are available. The most common is the use of thermocouples placed inside the rotating drum. Sometimes photocells or optical pyrometers are used to determine temperature in hot rotating drums.

In U.S. Pat. No. 3,896,556, a control system for a rotary coke cooler is described wherein signals from thermocouples in the drum control the amount of cooling liquid injected.

The use of thermocouples inside hot drums leads to problems because of the severe conditions to which the thermocouples are exposed, but prior to this invention, there was no effective way of controlling drum temperature using thermocouples positioned outside the drum.

SUMMARY OF THE INVENTION

According to the present invention, a parabolic collector having a temperature sensor located along its focal line is provided which can be placed near the outer surface of a rotating drum and can provide a control signal for a cooling spray or the like in response to heat collected by the collector and sensed by the sensor.

The collector is preferably mounted proximate a rotating drum in a manner that enables the collector to avoid actual contact with the drum exterior.

DETAILED DESCRIPTION OF THE PREFERRED EMBODIMENTS

The present invention has utility in any situation in which it is desired to measure or control the temperature of a rotating drum or kiln without having to place temperature measuring devices inside the drum or kiln. The invention is particularly useful in a temperature control system for a rotary coke cooler of the type commonly used to cool calcined delayed petroleum coke, and it is in this context that the following detailed description applies.

Figure 1:
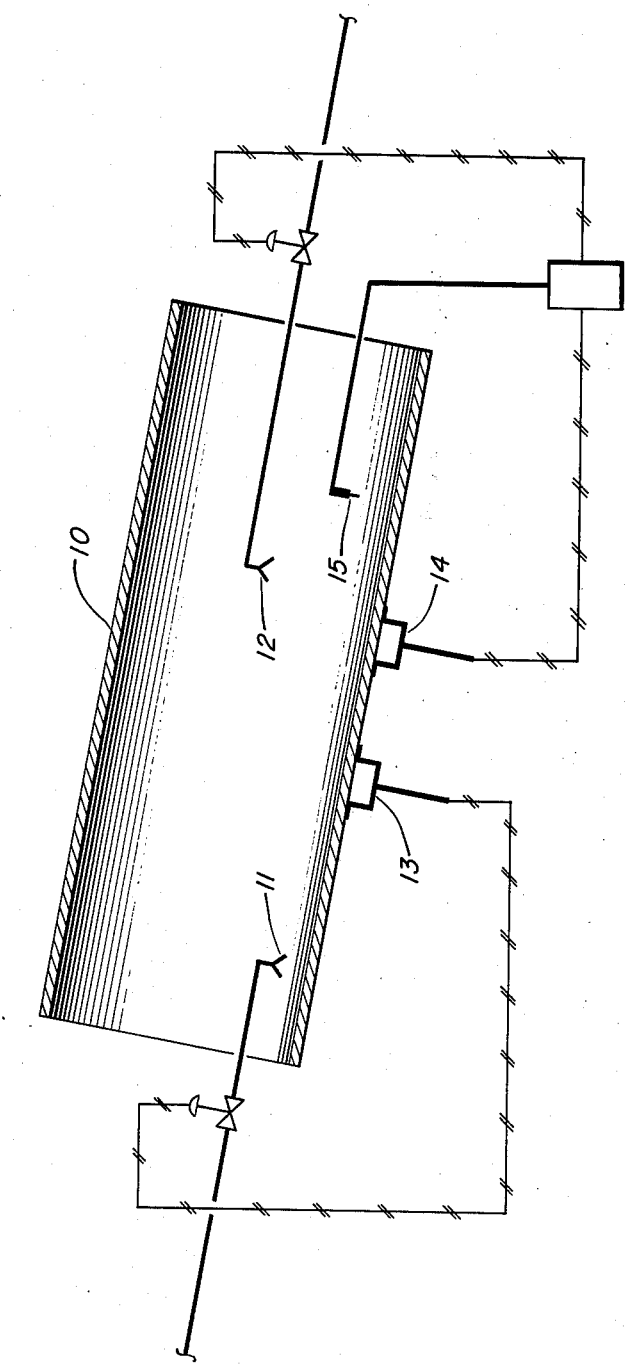
FIG. 1 is a schematic drawing of a control system utilizing the novel collector-sensors of this invention.

In FIG. 1, a rotary drum coke cooler 10 is shown. An inlet water spray 11 is positioned near the product inlet of the cooler, and an outlet water spray 12 is located near the product outlet end of the cooler. A first heat collector-sensor 13 is positioned adjacent the exterior of the cooler 10 and is adapted to control the rate of water sprayed through inlet water spray 11 in response to the temperature sensed by a sensor inside the collector as will be described in more detail below. A second heat collector-sensor 14 is positioned near the outlet end of drum cooler 10, and is adapted to control the amount of water sprayed through product outlet water spray 12.

In the system shown in FIG. 1, a product outlet thermocouple 15, which contacts cooled product before it exits the cooler, also provides input to the control means for the outlet water spray 12.

The use of water sprays to control the temperature of material in this type of drum cooler is known, as is the use of thermocouples positioned at appropriate places within the cooler. However, prior to this invention, there was no satisfactory way of controlling the amount of cooling water sprayed into the cooler using heat sensors located outside the drum cooler.

Figure 3:
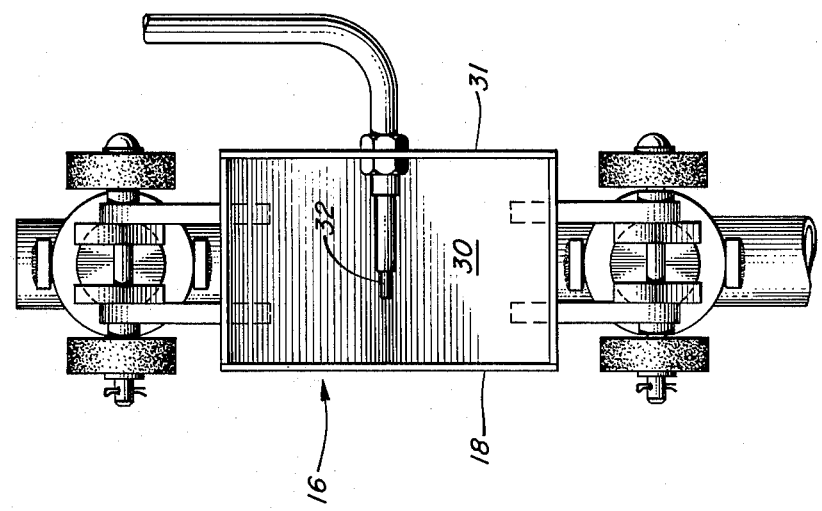
FIG. 3 is a front view of the collector of FIG. 2.
Figure 2:
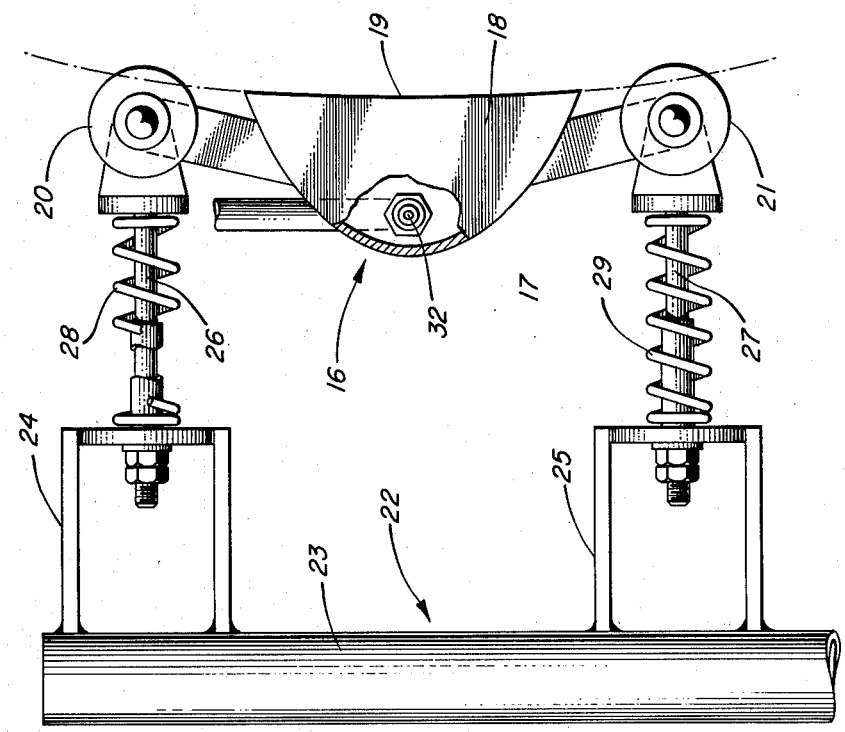
FIG. 2 is a side elevation illustrating a preferred collector and mounting means.

The heat collector-sensor of this invention is shown in more detail in FIGS. 2 and 3. FIG. 2 shows a collector-sensor 16 having an outer surface 17 of parabolic configuration. A side plate 18 is connected to outer surface 17, and includes an arcuate edge 19 which conforms to an arc of a circle such as the outer surface of a proximate rotating cylindrical drum. Protective roller means 20 and 21 are attached to the outer surface 17 such that rollers 20 and 21 extend slightly beyond the arc formed by extension of arcuate edge 19 of end plate 18.

Collector-sensor 16 is intended to be mounted adjacent to the outer surface of a cylindrical drum or kiln as shown in FIG. 1, but is not intended to be in actual contact therewith. The protective roller means 20 and 21 are designed to prevent contact between arcuate edge 19 of collector-sensor 16 and a proximately located rotating drum. In the event of expansion of a proximate rotating drum, or of nonuniformity of the diameter thereof, the rollers 20 and 21 will contact the outer surface of the drum, and mounting means 22 is designed to allow the assembly including collector-sensor 16 and rollers 20 and 21 to move in a direction away from the rotating drum.

Mounting means 22 includes a post 23 to which upper and lower brackets 24 and 25 respectively are attached. Upper rod 26 and lower rod 27 are slideably mounted in upper bracket 24 and lower bracket 25 respectively, and upper spring 28 and lower spring 29 are adapted to urge rollers 20 and 21 into a fixed location but to yield upon pressure against rollers 20 and 21 such that collector-sensor 16 moves away from a proximate rotating drum in the event the drum contacts rollers 20 and 21.

FIG. 3 is a front view of the collector-sensor 16 shown in FIG. 2 and includes a reflective inner surface 30. Side plate 31 has an opening formed therein along the focal line of the parabolic surface 17. A thermocouple 32 is mounted through this opening on the focal line within collector-sensor 16. Thermocouple 32 is operatively connected to a controller which controls the amount of water sprayed through a spray device located inside a drum cooler as shown in FIG. 1.

The mounting means shown in FIG. 3 has been found to perform very satisfactorily, but it will be apparent that other mounting devices adapted to position a collector-sensor adjacent a rotary drum in a yielding manner could be used. For example, a collector-sensor could be suspended from a pivoted frame utilizing a flexible positioning member of some type which limits the forward movement of the collector-sensor relative to the drum cooler but allows the collector-sensor to move away from the drum cooler.

The collector-sensor 16 of parabolic configuration, when positioned adjacent the outer surface of the rotary drum, concentrates heat radiated therefrom and focuses the collected heat along the focal line of the parabolic collector. By placing thermocouple 32 along this focal line, the amount of heat radiated is concentrated, and a strong signal can be obtained for more accurately controlling the water sprays inside the drum cooler.

The collector-sensors preferably are positioned adjacent a rotary drum part way up the side of the direction of rotation, as that is the position within the drum where the hot material will be concentrated, such that the sensitivity of the device is maximized.

This invention enables control of a rotary drum cooler without the requirement of placing thermocouples inside the hot regions of the drum, and accordingly reduces maintenance and improves reliability of the control system. Various modifications in the collector-sensor structure and the mounting means will be apparent to those skilled in the art and are to be considered to be within the scope of this invention of which the foregoing is a description of the most preferred embodiment.

We claim:

1. A device for use in controlling the temperature of a rotating cylindrical drum, the device comprising:
   (a) a parabolic collector having an interior focal line and a heat reflecting inner surface;
   (b) a side plate at each end of said collector, said side plates joined to said collector and including an arcuate edge adapted to conform to the outer surface of a proximate rotating cylindrical drum;
   (c) a thermocouple mounted in the interior of said collector at the focal line thereof;
   (d) protective rollers attached to said collector and extending slightly beyond the arc of said arcuate edge of said side plates; and
   (e) mounting means supporting said collector and said protective means and adapted to position said collector adjacent a rotating cylindrical drum, said mounting means yieldably supporting said collector and said protective means whereby said collector and said protective means are moveable relative to said mounting means in response to pressure on said protective means from contact with the outer surface of said rotating cylindrical drum, said mounting means including a post having an upper and a lower bracket, said brackets having rods connected to said rollers slidably mounted therein and having springs adapted to urge said rollers into a fixed position and to yield under pressure against said rollers such that said collector moves away from said rotating cylindrical drum upon said drum contacting said rollers.

* * * * *